US011621882B1

(12) United States Patent
Wilkinson et al.

(10) Patent No.: US 11,621,882 B1
(45) Date of Patent: Apr. 4, 2023

(54) AUTOMATED REMEDIAL ACTIONS FOR SERVICE LEVEL OBJECTIVE THRESHOLDS

(71) Applicant: UIPCO, LLC, San Antonio, TX (US)

(72) Inventors: Christopher Thomas Wilkinson, Boerne, TX (US); Robert L. Johnson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/586,927

(22) Filed: Jan. 28, 2022

(51) Int. Cl.
| H04L 41/0604 | (2022.01) |
| H04L 41/0631 | (2022.01) |
| H04L 41/5019 | (2022.01) |
| H04L 47/74 | (2022.01) |
| H04L 47/70 | (2022.01) |
| H04L 41/0654 | (2022.01) |

(52) U.S. Cl.
CPC ...... H04L 41/0627 (2013.01); H04L 41/0631 (2013.01); H04L 41/0654 (2013.01); H04L 41/5019 (2013.01); H04L 47/746 (2013.01); H04L 47/822 (2013.01)

(58) Field of Classification Search
CPC ............. H04L 41/0627; H04L 41/0631; H04L 41/0654; H04L 41/5019; H04L 47/746; H04L 47/822
USPC ...................................................... 709/224
See application file for complete search history.

(56) References Cited

U.S. PATENT DOCUMENTS

| 7,185,113 | B1 * | 2/2007 | Haberman | .......... H04L 12/5601 |
| | | | | 709/250 |
| 8,819,673 | B1 | 8/2014 | Wilkinson et al. | |
| 9,582,328 | B1 * | 2/2017 | Tao | ..................... G06F 9/45558 |
| 9,641,431 | B1 * | 5/2017 | Fellows | ................ G06F 9/5083 |
| 9,929,926 | B1 * | 3/2018 | Streete | .................... H04L 43/20 |
| 10,374,978 | B2 * | 8/2019 | Jaisinghani | ......... H04L 41/0803 |
| 11,113,090 | B1 | 9/2021 | Wilkinson et al. | |
| 2002/0147611 | A1 | 10/2002 | Greene et al. | |
| 2003/0036886 | A1 * | 2/2003 | Stone | .................. G06F 11/3495 |
| | | | | 714/E11.202 |
| 2005/0036601 | A1 * | 2/2005 | Petrunka | ............. H04M 3/4931 |
| | | | | 379/218.01 |
| 2005/0246217 | A1 * | 11/2005 | Horn | .................. G06Q 10/1093 |
| | | | | 705/7.18 |

(Continued)

Primary Examiner — David P Zarka
(74) Attorney, Agent, or Firm — Potomac Law Group, PLLC

(57) ABSTRACT

Aspects of the present disclosure are directed to an automated remediation system that can receive service level objective (SLO) alerts or notifications and, based on the type, take automated remedial actions. The automated remediation system can perform automated responses to various SLO alerts such as latency alerts, error budget alerts, burn rate alerts, etc. The automated remediation system can utilize a mapping to select which automated response to perform; can measure the effectiveness of the automated response using a metric defined for the alert type; and, until the issue is resolved or no further actions are mapped to the alert type, can repeat the initial automated response or can take secondary automated responses. The automated remediation system can also report the alert and the remedial actions taken.

20 Claims, 10 Drawing Sheets

(56) References Cited

U.S. PATENT DOCUMENTS

| | | | |
|---|---|---|---|
| 2006/0188011 A1* | 8/2006 | Goldszmidt | G06Q 10/04 375/229 |
| 2006/0276995 A1* | 12/2006 | Breitgand | H04L 43/16 702/179 |
| 2011/0029981 A1* | 2/2011 | Jaisinghani | H04L 67/30 718/100 |
| 2012/0317358 A1* | 12/2012 | Ando | G06F 3/067 711/E12.002 |
| 2015/0058317 A1* | 2/2015 | Charlot | G06F 16/248 707/722 |
| 2015/0234902 A1* | 8/2015 | Dageville | A61F 5/566 707/770 |
| 2015/0348053 A1* | 12/2015 | Nieto | G06Q 30/018 705/317 |
| 2018/0246729 A1 | 8/2018 | Kumar et al. | |
| 2019/0042321 A1 | 2/2019 | Venkatesh et al. | |
| 2020/0052979 A1* | 2/2020 | Clemm | H04L 41/5019 |
| 2020/0167360 A1* | 5/2020 | Rath | G06F 3/061 |

\* cited by examiner

AUTOMATED REMEDIAL ACTIONS FOR SERVICE LEVEL OBJECTIVE THRESHOLDS

CROSS-REFERENCE TO RELATED APPLICATIONS

This application is related to U.S. patent application Ser. No. 17/397,548, titled "SYSTEMS AND METHODS FOR CONTAINER MANAGEMENT," filed Aug. 9, 2021, which is herein incorporated by reference in its entirety.

TECHNICAL FIELD

The present disclosure is directed to a system that can receive notifications, such as service level objective (SLO) notifications and, based on the notification type with comparisons to corresponding thresholds, take automated remedial actions.

BACKGROUND

Server systems support may of the world's computing activities. Systems connect to servers to access services such as the internet, remote databases, or external compute power. Due to the ubiquitous nature of these activities, server systems have issues such as experiencing severe load, must be geographically distributed, and must provide a variety of redundancies. Effective server planning in various dimensions such as network capacity, storage, and compute can be very difficult to achieve, especially in the constantly changing environments of network traffic and server statuses. Service level objectives (SLOs) define expected service characteristics between the server system and customers. SLOs are measurable features of a system in dimensions such as availability, latency, throughput, frequency, and quality. SLOs provide a quantitative measures of a level of service being provided, such as an availability measure (e.g., an executing application will be available 99.2% of the time); latency (e.g., 88% of TCP replies are received within 1.2 seconds of sending a request); client load (e.g., a server should not be serving more than 1 k connections at a given time); etc. Currently, various systems can monitor SLO compliance and can notify an administrator with an SLO alert when an SLO is predicted to fail, and the administrator can attempt corrective actions.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
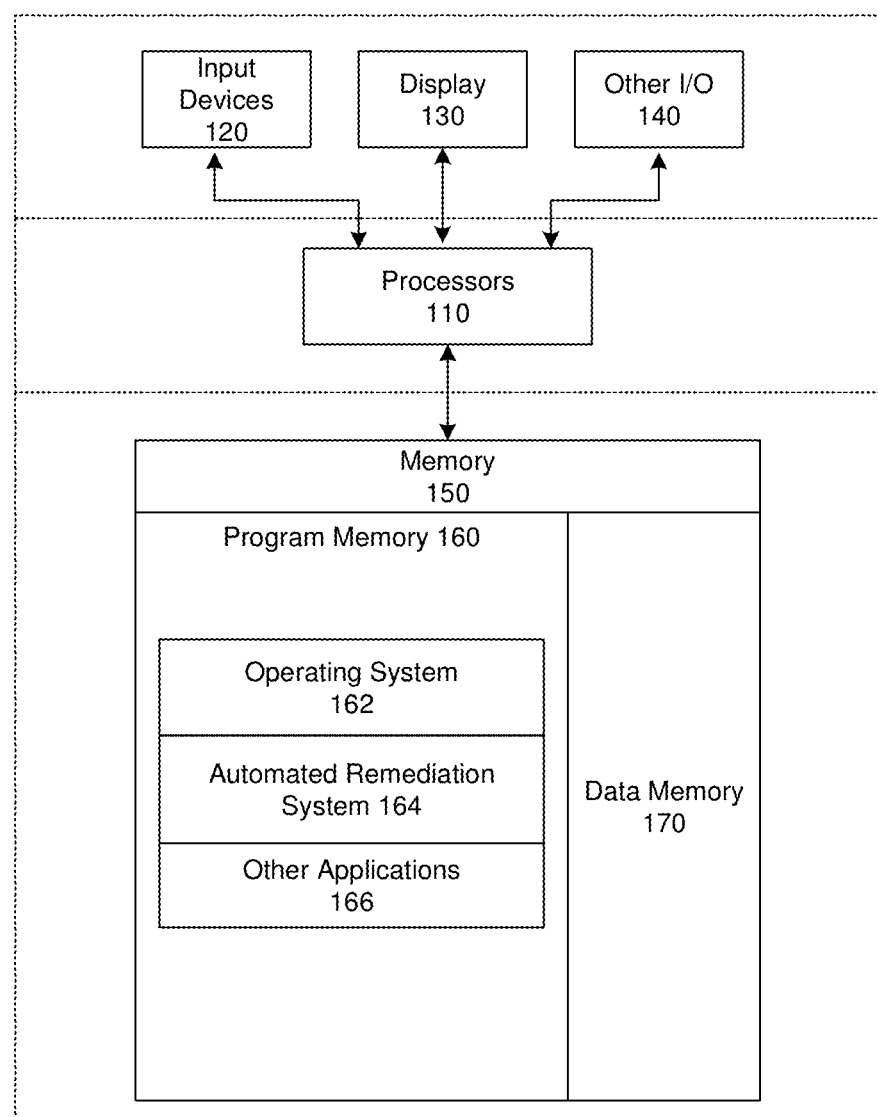
FIG. 1 is a block diagram illustrating an overview of devices on which some implementations can operate.

Aspects of the present disclosure are directed to an automated remediation system that can receive service level objective (SLO) alerts or notifications and, based on the type (with comparisons to corresponding thresholds), can take automated remedial actions. The automated remediation system can perform automated responses to various SLO alerts such as latency alerts, error budget alerts, identifications of resource under-utilization, availability burn rate alerts, latency burn rate alerts, traffic burn rate alerts, saturation burn rate alerts, infrastructure tier burn rate alerts, maximum threads or connections alerts, etc. A "burn rate" can be a computed trend for a given metric (e.g., slope of a function fitted to data points for the metric), over a period of time. The automated remediation system can utilize a matrix or other mapping of actions to alerts to select which automated response to perform. In some cases, the automated remediation system can receive a SLO alert or other notification; take an initial action mapped to the alert or to features of the alert; determine if the initial action improved the situation that caused the alert; if so, repeat the action until the situation is resolved or the action it is no longer improving the situation; if not, the automated remediation system can take an alternate action if one is mapped to the SLO alert; and once the situation is resolved or there are no further actions mapped to the SLO alert, the automated remediation system can report the alert and the remedial actions taken to an administrator to either notify of them of the automatically resolved SLO alert or to have the administrator take further manual actions for the SLO alert.

In various implementations, automated remedial responses that the automated remediation system can perform based on the mapping of alerts/alert characteristics to responses include spinning up additional resources such as network nodes as (virtual machines or contracting additional physical machines), contracting data centers, adding clusters, etc.; shunting actions for a malfunctioning service to another provider of the service; quiesce a network entity or service until it is brought back to a functional state; bounce traffic to an alternate web tier; etc. For example, the automated remediation system can determine whether the alert (or alert characteristics) is of a type likely to be improved by additional resources and, if so, can spin up additional resources; and the automated remediation system can determine whether the alert (or alert characteristics) is of a type specific to a particular service or network entity and, if so, can shunt queries to an alternate provider of the service and/or can quiesce the network entity, etc.

The reporting performed by the automated remediation system can notify an administrator of the SLO alert for an issue that was (or still is) occurring. The report can provide details of the remedial action(s) attempted (e.g., resources spun up, which network entities or services/applications were quiesced, how traffic was rerouted, etc.) and/or how these actions affected the status of the issue. In some cases, characteristics of the reporting can depend on whether the remedial actions solved the issue. For example, if the remedial actions completely solved the issue, the report can be marked low urgency and can include statistics on how the automatic remedial actions resolved the issue. However, if the automated remedial actions did not improve the issue, the report can be marked high urgency, can include details on what automated remedial actions were ineffective (so they don't need to be repeated), and can include suggestions for manual remedial actions.

In existing network monitoring and remediation systems, issue alerts, such as from an SLO database, are provided to a network administrator who may eventually take remediation actions. Such existing systems require significant human resources to manage, have extended down time when there's an issue, are subject to administrators failing to take corrective actions when they do not receive a report or have other urgent matters to attend to, and appropriate remedial actions can be delayed taken when an administrator is inexperienced or does not have a correct understanding of which actions are most likely to resolve an issue.

The automated remediation methods and systems described herein are expected to overcome these problems with existing systems by providing remediation actions that are automatically taken when an issue arises. The automated remediation system can receive a SLO alert or other notification; take an initial action mapped to the alert or to features of the alert; determine if the initial action improved the situation that caused the alert; if so, can repeat the action until the situation is resolved or the action it is no longer improving the situation; and if not, the automated remediation system can take an alternate action if one is mapped to the SLO alert. In some cases, the automated remediation system can also automatically determine characteristics of the network, such as which network entities may be causing the issue, how well initial remediation actions are affecting the issue, or what other service providers can be tapped to take over a faulty provider. A human administrator may not be able to determine such factors in a manner timely enough to quickly update their strategy or take alternate remediation actions. Thus, through this automated remediation system and methods, network issues are resolved more quickly, more accurately, and with less allocated resources than in existing systems.

Several implementations are discussed below in more detail in reference to the figures. FIG. 1 is a block diagram illustrating an overview of devices on which some implementations of the disclosed technology can operate. The devices can comprise hardware components of a device 100 that can receive service level objective (SLO) notifications and, based on the notification type with comparisons to corresponding thresholds, take automated remedial actions. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, automated remediation system 164, and other application programs 166. Memory 150 can also include data memory 170, e.g., SLO alerts, mappings of alerts to remedial actions with corresponding comparison thresholds, procedures for spinning up resources, shunting queries, and other remedial actions, templates for reporting results, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
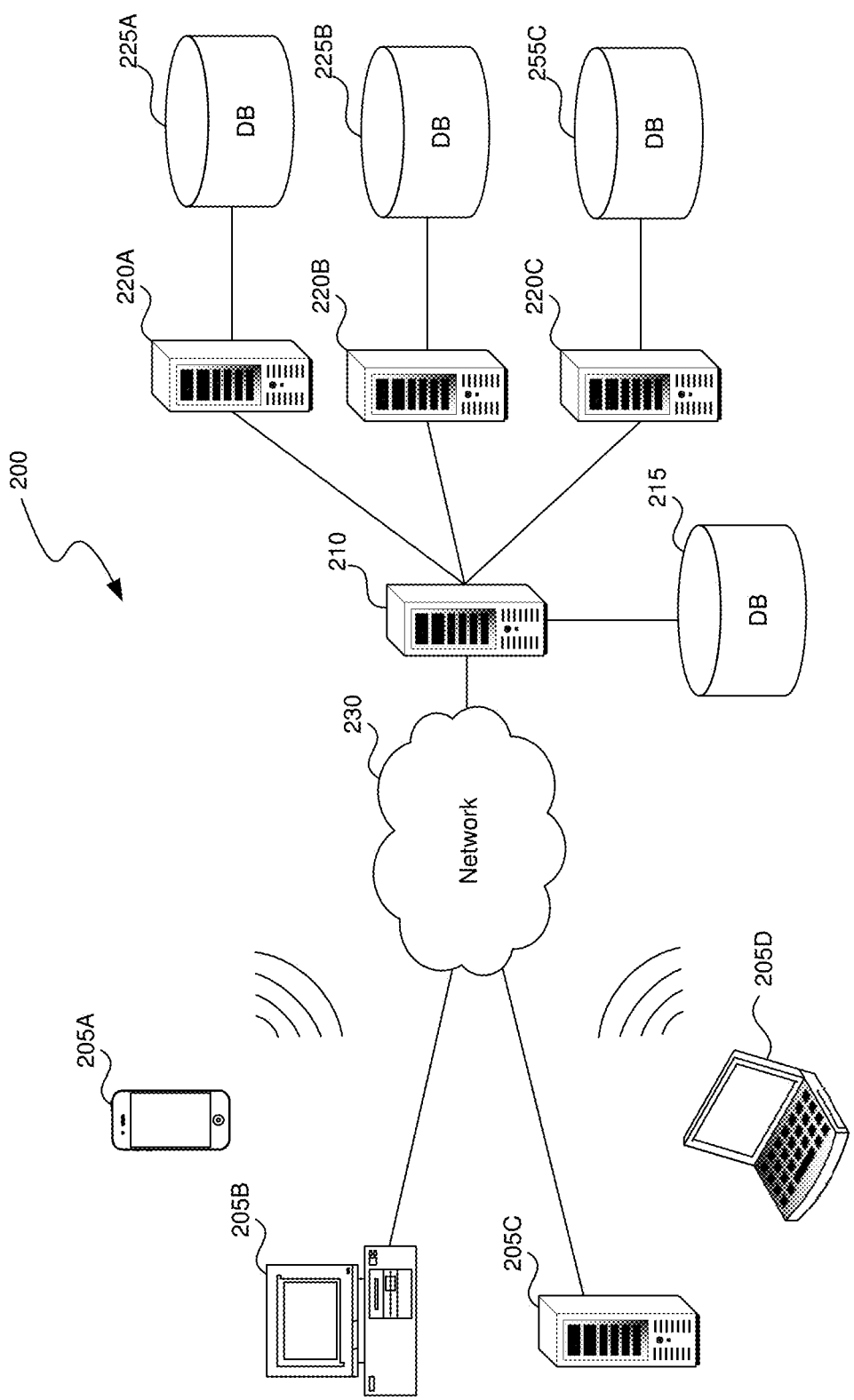
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
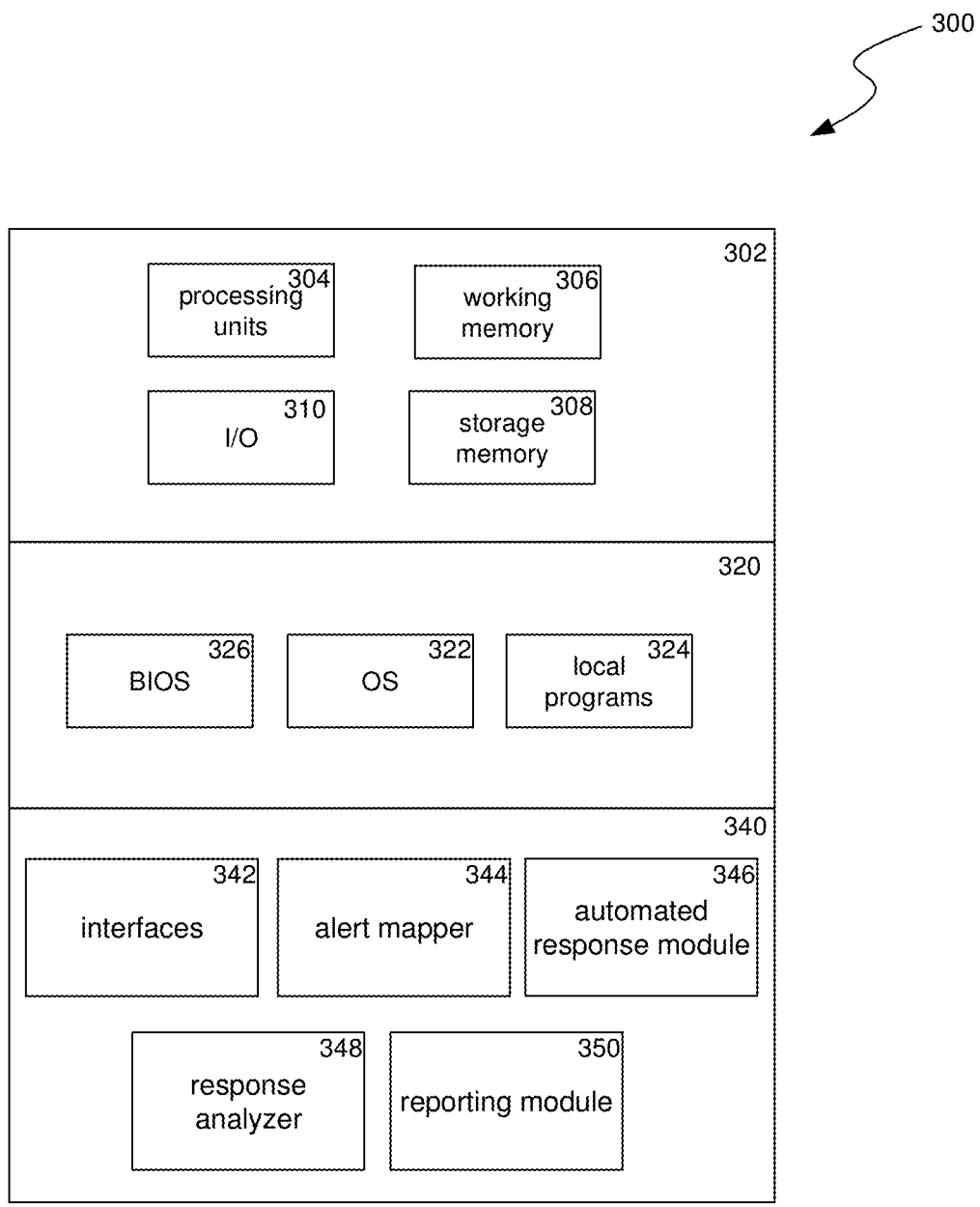
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include an alert mapper 344, an automated response module 346, a response analyzer 348, a reporting module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

The alert mapper 344 can receive various types SLO alerts and other notifications from network monitoring systems. For example, the alerts can include latency alerts, error budget alerts, identifications of resource under-utilization, availability burn rate alerts, latency burn rate alerts, traffic burn rate alerts, saturation burn rate alerts, infrastructure tier burn rate alerts, maximum thread alerts, or maximum connection alerts. The alert mapper 344 can include a mapping of alert types or characteristics to initial automated remedial actions. In some cases, the alert mapper 344 can also include various thresholds, for corresponding alerts, to analyze whether the incoming alerts rise to a level for which automated actions should be performed. If so, the alert mapper 344 can signal to the automated response module 346 to perform the corresponding action. In some cases, the mapping can also include one or more alternate automated remedial actions that the alert mapper 344 can signal to the automated response module 346 to perform if the response analyzer 348 determines that previous automated response actions were not sufficiently effective in resolving an issue causing the alert.

The automated response module 346 can receive an indication, from alert mapper 344, of an automated remedial action to take in relation to one or more network entities and can interface with the network entities to perform the indicated automated remedial action. The automated remedial actions that can be effectuated by automated response module 346 can include spinning up additional resources, shunting actions for a malfunctioning service to another provider; quiescing a network entity or service until it is brought back to a functional state; bouncing traffic to an alternate web tier; etc.

The response analyzer 348 can interface with a reporting system and/or directly with network entities to determine whether a remedial action prompted by automated response module 346 had an effect on an issues that caused an alert received by alert mapper 344. In some cases, the response analyzer 348 can determine whether the remedial action did not improve the issue, provided some improvement but did not resolve the issue, or resolved the issue. These statuses can be provided to the alert mapper 344 and to reporting module 350 to determine whether to take an alternate remedial action when remedial action did not improve the issue, to repeat the remedial action when it provided some improvement but did not resolve the issue, and to report the issue and details of the resolving automated actions taken.

The reporting module 350 can proved a report for an administrator in relation to a received alert. The report can provide details of the remedial action(s) attempted (e.g., resources spun up, which network entities or services/applications were quiesced, how traffic was rerouted, etc.) and/or how these actions affected the status of the issue. In some cases, characteristics of the reporting can depend on whether the remedial actions solved the issue. For example, if the remedial actions completely solved the issue, the report can be marked low urgency and can include statistics on how the automatic remedial actions resolved the issue. However, if the automated remedial actions did not improve the issue, the report can be marked high urgency, can include details on what automated remedial actions were ineffective (so they don't need to be repeated), and can include suggestions for manual remedial actions.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
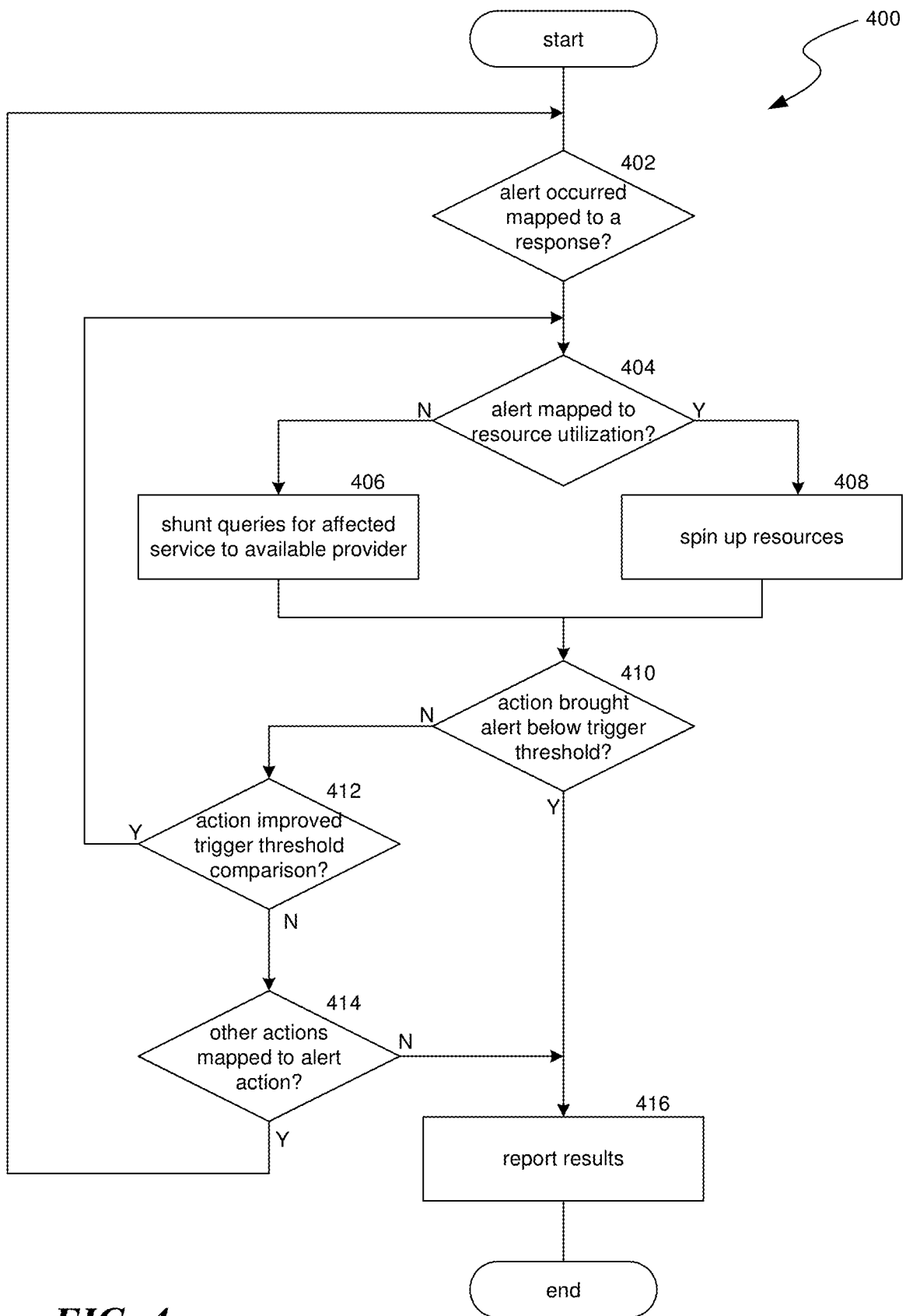
FIG. 4 is a flow diagram illustrating a process used in some implementations for automatically taking remedial actions for service level objective (SLO) thresholds.

FIG. 4 is a flow diagram illustrating a process 400 used in some implementations for automatically taking remedial actions for service level objective (SLO) thresholds. In some implementations, process 400 can be a process performed in an administrator system in response to alerts from a SLO database or other SLO monitoring system.

At block 402, process 400 can determine when a received alert is mapped to an automatic response. Process 400 can accomplish this by indexing a defined mapping to see if the alert is mapped to an automated response. Examples of such alerts that process 400 can determine are mapped to responses can include one or more of: query latency SLO alerts, error budget SLO alerts, identifications of resource under-utilization, burn rate on availability SLO alerts, burn rate on latency SLO alerts, burn rate on traffic SLO alerts, burn rate on saturation SLO alerts, burn rate on infrastructure tier SLO alerts, maximum threads or connections SLO alerts, etc.

At block 404, process 400 can determine whether the alert is identified as being a server resource issue. For example, the alert can be for a server availability issue mapped to being primarily solvable by adding resources. As another example, the alert can be for a latency issue, also mapped to being primarily solvable by adding resources. As yet a further example, the alert can be for a server returning hard errors, mapped to not being solvable by adding resources. If the alert is not identified as being a resource issue, process 400 can continue to block 406; and if so, process 400 can continue to block 408.

At block 406, process 400 can identify an alternate provider for the service related to the alert and can shunt queries for the service to the alternate provider. This can include identifying another node or availability zone where there is excess capacity and/or for which the service is not generating similar errors. In some cases, process 400 can also perform a reinitialization in relation to the service for which the alert was issued—e.g., for the service itself, for a related server or virtual machine, for a related availability zone, etc.

At block 408, process 400 can spin up additional resources related to the service for which the alert was issued. This can include identifying which availability zone the alert was issued for and adding resources, e.g., executing a related service, adding nodes (virtual machines or contracting additional physical machines), contracting data centers, adding clusters, etc. In some implementations, the alert may be that resources are being under-utilized, and corresponding resources can be spun down instead of being spun up.

At block 410, process 400 can determine whether the automatic remedial action, taken at block 406 or 408, brough the activity that caused the alert from block 402 below a corresponding triggering threshold. If so, process 400 can continue to block 416; if not, process 400 can continue to block 412.

At block 412, process 400 can determine if automatic remedial action taken at block 406 or 408 caused a significant reduction in the activity that caused the alert from block 402. A "significant" reduction can be a reduction that is and amount outside a determined normal variance for the alert type. If the automatic remedial actions caused the significant reduction, process 400 can return to block 404 (and then either 406 or 408) to repeat the action until it is determined (by a yes at block 410) that the alert condition is resolved or until it is determined (by a no at block 412) that the action is no longer improving the alert condition. If not, process 400 can continue to block 414.

At block 414, process 400 can determine whether the alert from block 402 is mapped to any automatic actions that have not yet been performed. For example, if a first action mapped to the alert was to spin up resources (at block 408) but doing so did not resolve the alert condition, an alternate action may be taken such as shunting requests for the service related to the alert to another availability zone (at block 406). If not, process 400 can continue to block 416; and if so, process 400 can return to block 402, where process 400 can select the next additional action mapped to the received alert.

At block 416, process 400 can report the alert identified at block 402 and results of any of the various automated responses taken by process 400. This can include providing details of the alert (e.g., what caused it, what services it relates to, what machines or availability zones it relates to, etc.), an indication of whether the automated responses were successful in resolving the alert condition and, if not, may also include suggested further manual actions. Following the reporting, process 400 can end.

Figure 5:
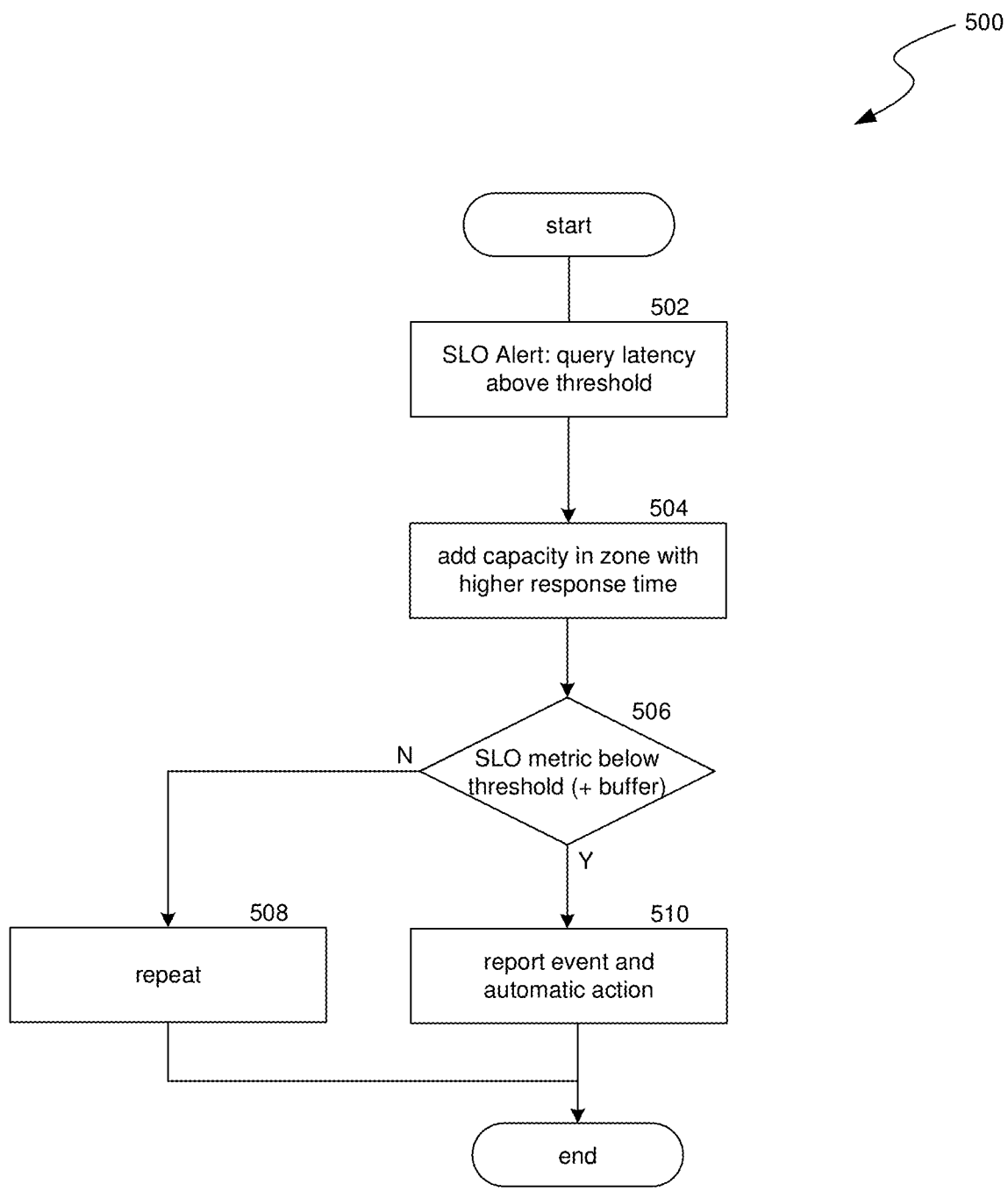
FIG. 5 is a flow diagram illustrating a process used in some implementations for automatically taking remedial actions for query latency SLO alerts.

FIG. 5 is a flow diagram illustrating a process 500 used in some implementations for automatically taking remedial actions for query latency SLO alerts. In some implementations, process 500 is a specific instance of process 400.

At block 502, process 500 can receive a SLO alert indicating that query latency is above a defined threshold. In some cases, the alert can be for a particular network entity such as a node, availability zone, data center, or cluster.

At block 504, process 500 can add capacity in one or more availability zones, to provide lower latency for the queries experiencing latency above the threshold.

At block 506, process 500 can determine whether a the SLO for latency in the availability zone, indicated by the alert received at block 502, is now below the threshold. This may include determining if the latency is below the threshold by a specified buffer amount. If so, process 500 can proceed to block 510; and if not, process 500 can proceed to block 508. In some implementations, process 500 can have a timeout period after implementing block 504, allowing the added capacity to take effect before determining whether that automated response was effective.

At block 508, process 500 can repeat process 500 until an instance of block 506 returns yes or until a maximum amount of capacity has been added. For example, process 500 can iteratively add resources to various availability zones until the latency SLO is met.

At block 510, process 500 can report to an administrator the SLO alert indicating that query latency was (or still is) above the defined threshold. Process 500 can also provide details of the amount and zones in which capacity was added in the various executions of block 504 and how these actions affected the status of the latency SLO. In some cases where the latency SLO alert was not resolved by the capacity added in the various executions of block 504, the report can also provide suggested further manual actions. Following the reporting, process 500 can end.

Figure 6:
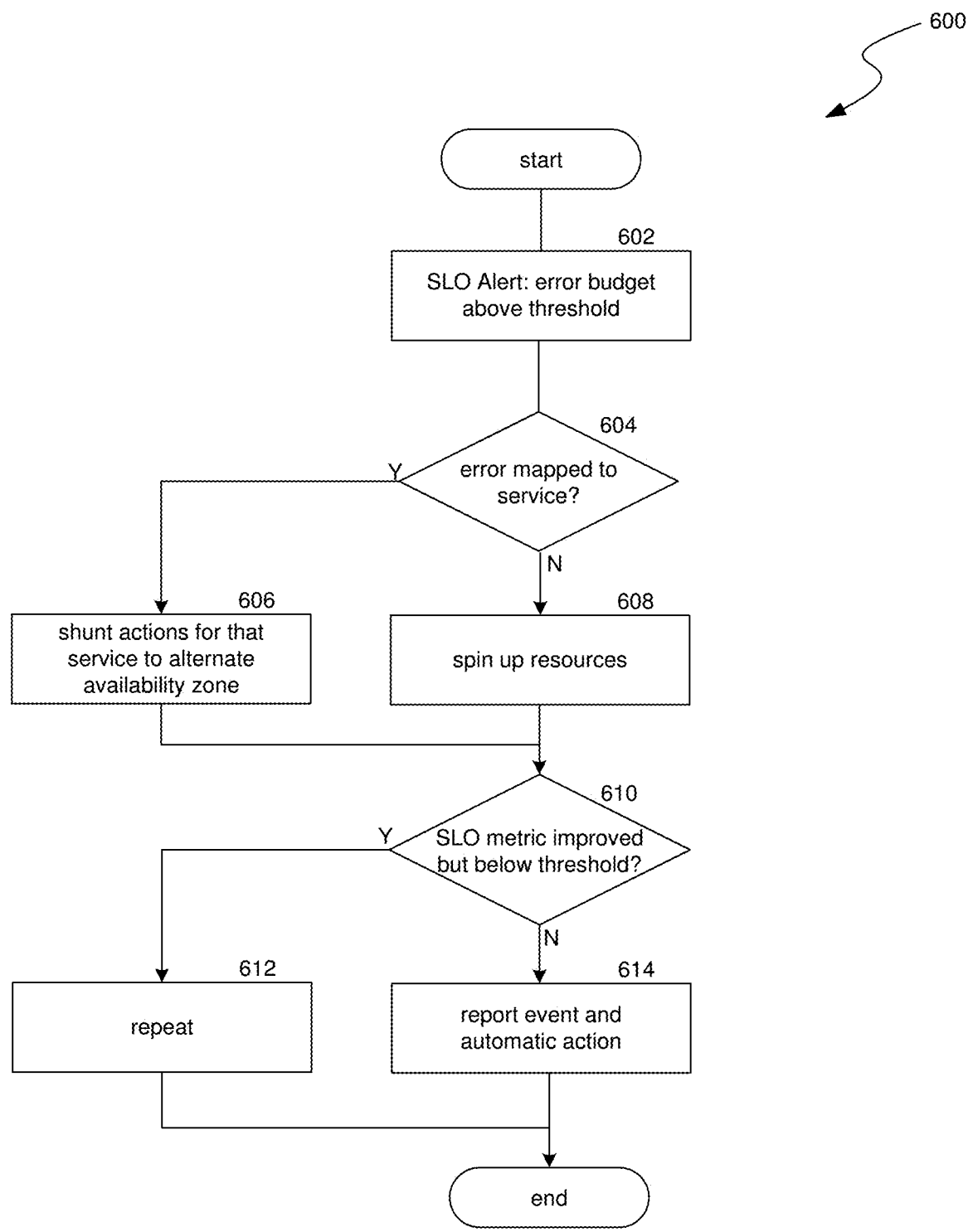
FIG. 6 is a flow diagram illustrating a process used in some implementations for automatically taking remedial actions for error budget SLO alerts.

FIG. 6 is a flow diagram illustrating a process 600 used in some implementations for automatically taking remedial actions for error budget SLO alerts. In some implementations, process 600 is a specific instance of process 400.

At block 602, process 600 can receive a SLO alert indicating that an error budget (e.g., for a particular type or types of error or for errors generally) is above a defined threshold. In some implementations, an error is counted for a node or availability zone when a query response is anything other than a positive response (e.g., code 200). In some cases, certain other codes can be excluded from being counted against the error budget—such as errors in the 400 series that result from improperly configured queries. In some implementations, different error budgets can be setup for different error types e.g., for hard errors such as a 501 not implemented error, a 502 bad gateway error, and a 503 service unavailable error and can be mapped to different automated responses.

At block 604, process 600 can identify if the set of errors that are being recorded, causing the alert from block 602, are mapped to a particular service. For example, errors such as a 508 (loop detected) error may be the result of a malfunctioning service. When the set of errors that are being recorded are mapped to a particular service, process 600 can continue to block 606; otherwise the errors are likely the result of insufficient server resources and process 600 can proceed to block 608.

At block 606, process 600 can identify an alternate provider for the service identified at block 604 as related to the alert from block 602, and can shunt queries for the service to the alternate provider. This can include identifying another node or availability zone where there is excess capacity and/or for which the service is not generating similar errors. In some cases, process 600 can also perform a reinitialization in relation to the service for which the alert was issued—e.g., for the service itself, for a related server or virtual machine, for a related zone, etc.

At block 608, process 600 can spin up additional resources related to the service for which the alert was issued. This can include identifying which availability zone the alert was issued for and adding resources, e.g., executing a related service, adding nodes (virtual machines or contracting additional physical machines), contracting data centers, adding clusters, etc.

If block 606 was performed, at block 610, process 600 can determine whether the alternate service provider, setup at block 606, to service the queries for the service resulting in the errors, caused the error budget to be improved but still above the alert triggering threshold (which may include a specified buffer amount). If block 608 was performed, at block 610, process 600 can determine whether the spun up resources, added at block 608, caused the error budget to be improved but still above the alert triggering threshold (which may include a specified buffer amount). If the error budget was improved but is still above the alert triggering threshold (plus the buffer amount, if any), process 600 can continue to block 612; if not (meaning either the automatic remedial actions of blocks 606 or 608 did not improve the error budget or these remedial actions brought the error budget below the alert triggering threshold—by at least the buffer amount, if any), process 600 can continue to block 614.

At block 612, process 600 can repeat process 600 until an instance of block 610 returns no or until a maximum amount of resources have been added at an instance of block 608 or there are no other availability zones to shunt queries to at block 606. For example, process 600 can iteratively spin up resources and/or select new availability zones until the error budget SLO is met. In some cases when process 600 repeats, an alternate remedial action may be performed. For example, if resources were spun up in a previous iteration of process 600, queries can be shunted to an alternate availability zone in the next iteration.

At block 614, process 600 can report to an administrator the SLO alert indicating that the error budget was (or still is) above the corresponding threshold. Process 600 can also provide details of the amount and zones in which resources were added in the various executions of block 608, how queries were shunted to other availability zones in the various executions of block 606, and/or how these actions affected the status of the error budget SLO.

The reporting that is performed at block 614 can depend on whether the remedial actions did not improve or completely solved the issue, as determined at block 610. For example, if the remedial actions completely solved the issue, the report can be marked low urgency and can include statistics on how the automatic remedial actions resolved the error budget SLO issue. However, if the automated remedial actions did not improve the error budget SLO issue, the report can be marked high urgency, can include details on what automated remedial actions were ineffective (so they don't need to be repeated), and can include suggestions for manual remedial actions. Following the reporting, process 600 can end.

Figure 7:
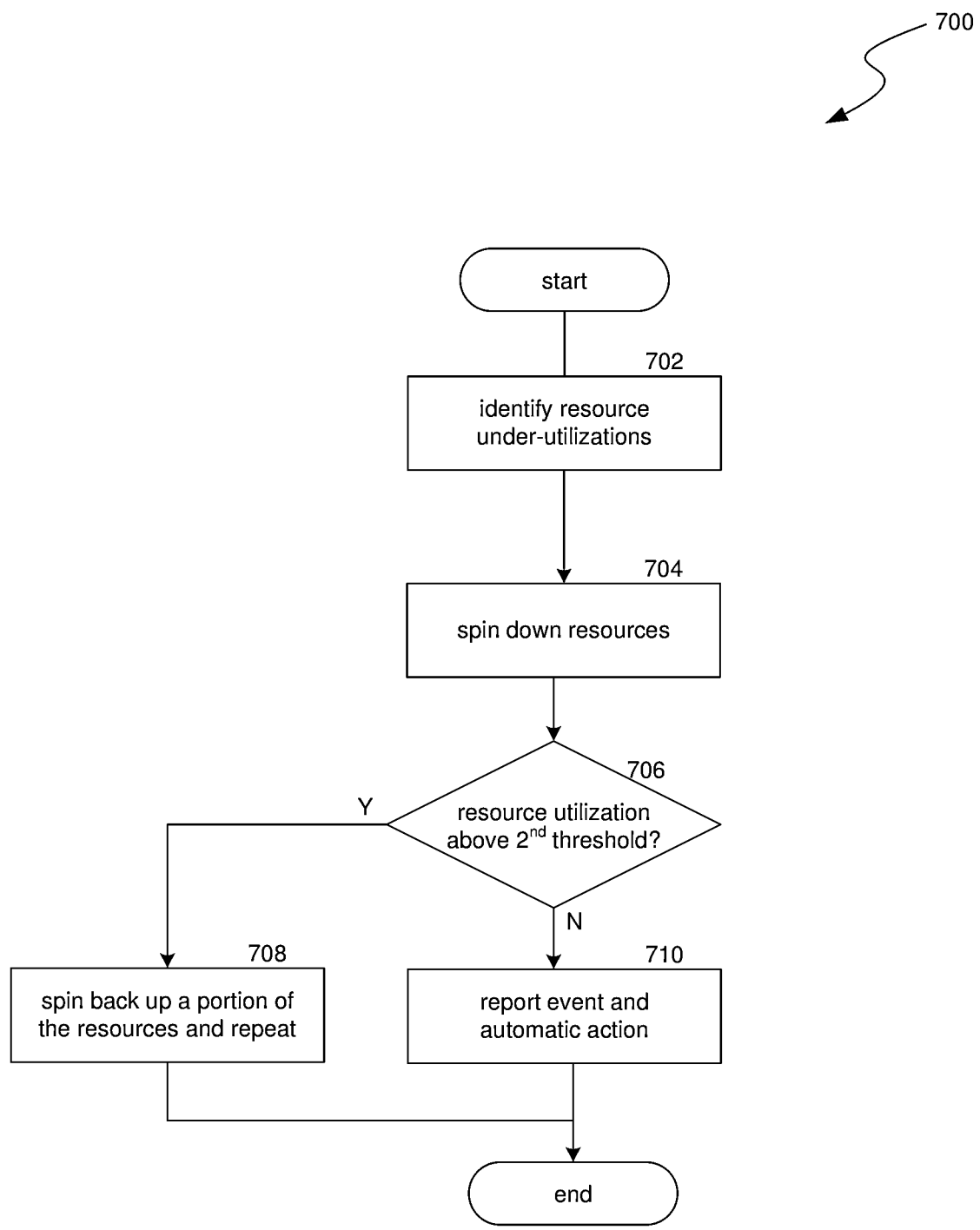
FIG. 7 is a flow diagram illustrating a process used in some implementations for automatically taking remedial actions for identifications of resource under-utilization.

FIG. 7 is a flow diagram illustrating a process 700 used in some implementations for automatically taking remedial actions for identifications of resource under-utilization. In some implementations, process 700 is a specific instance of process 400.

At block 702, process 700 can identify that (e.g., through an alert from a resource monitoring service) that the resources of a given node or availability zone are being under-utilized (i.e., resource utilization is below a threshold). In response, at block 704, process 700 can remove capacity from the node or availability zones indicated at block 702.

At block 706, process 700 can determine whether the resource utilization in the node or availability zones indicated at block 702 (or in another node or availability zone where the change may be the result of the decrease in capacity) caused a change related to a second threshold (e.g., a threshold indicating one or more SLOs may not be met, such as from an alert discussed in relation to one of FIGS. 5, 6, 8, or 9). If so, process 700 can proceed to block 708; and if not process 700 can proceed to block 710.

At block 708, process 700 can spin back up some or all of the resources spun down at block 704. This can include, for example, performing process 500 or reinitializing a portion of the spun down resources (e.g., one-third or one-half of them). If process 700 can repeat if additional resources can be spun down.

At block 710, process 700 can report to an administrator resource under-utilization determination from block 702. Process 700 can also provide details of the amount and zones in which resources were spun down in the various executions of block 704 and how these actions affected the resource utilization in various nodes or availability zones and/or the effect on other SLOs. Following the reporting, process 700 can end.

Figure 8:
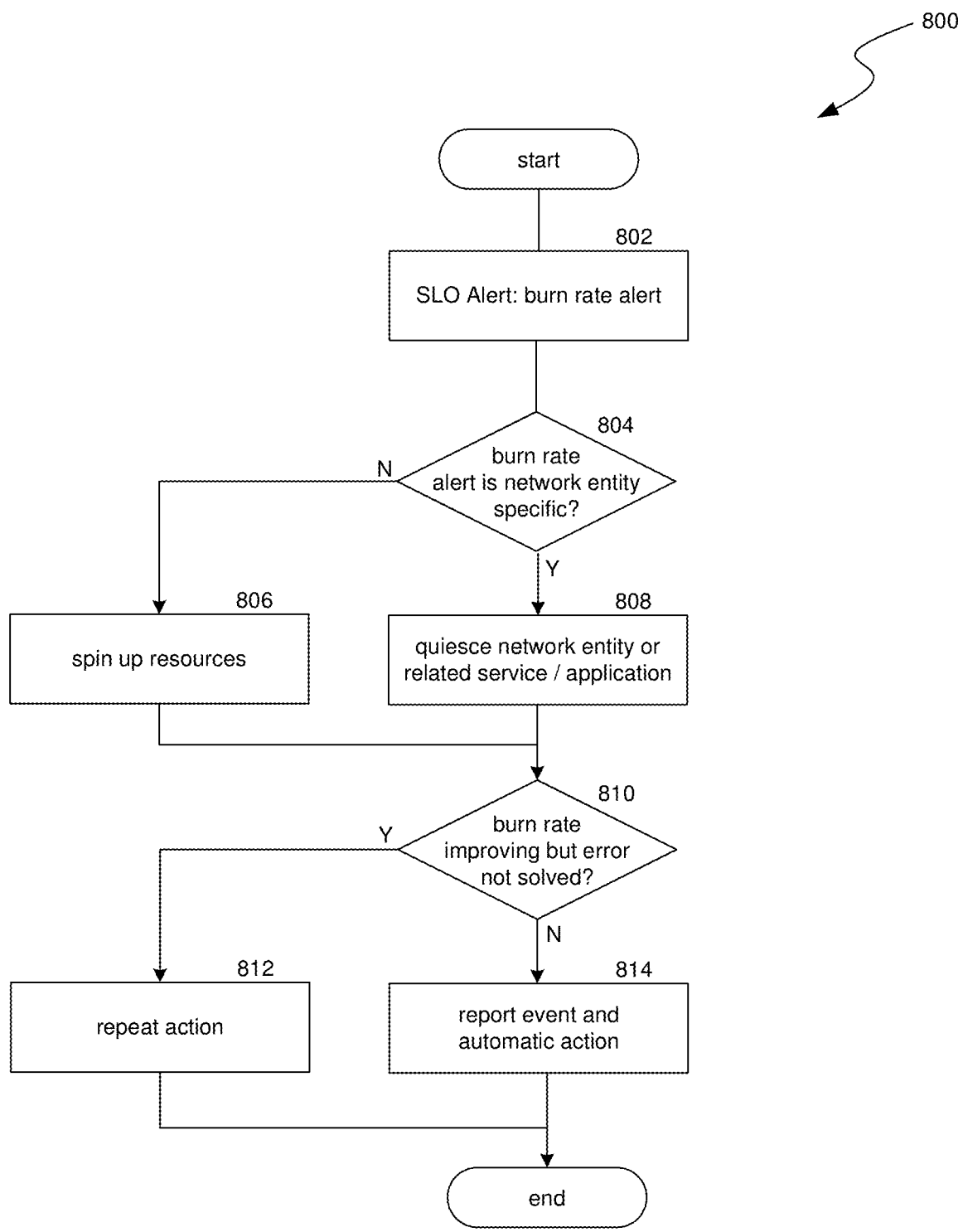
FIG. 8 is a flow diagram illustrating a process used in some implementations for automatically taking remedial actions for various burn rate SLO alerts.

FIG. 8 is a flow diagram illustrating a process 800 used in some implementations for automatically taking remedial actions for various burn rate SLO alerts. In some implementations, process 800 is a specific instance of process 400. A burn rate is a trend in a SLO metric. The metrics, for example can include server availability, latency, traffic, saturation, or infrastructure tiers. The burn rates can be determined over a period of time set for that metric, (e.g., seconds, minutes, hours, days, or months). The burn rates can be computed, for example, by fitting a function to multiple data points for the metric across the period of time (which may exclude momentary spike or valley data points) and determining the average derivative (slope) of the function for the period of time.

At block 802, process 800 can receive a burn rate SLO alert, indicating that a computed burn rate is above a corresponding threshold. The burn rate alerts, for example can include one or more of an SLO alert for a burn rate on availability, an SLO alert for a burn rate on latency, an SLO alert for a burn rate on traffic levels, an SLO alert for a burn rate on saturation levels, or an SLO alert for a burn rate on infrastructure tiers. The SLO alert can be triggered when the burn rate is above a threshold and, in some implementations, each burn rate type can have its own threshold for triggering that burn rate SLO alert.

At block 804, process 800 can identify if the burn rate for the SLO alert received at block 802 is mapped as being specific to a network entity such as a cluster, data center, availability zone, server, or virtual node. For example, process 800 can check for a pattern of events, associated with a particular network entity, that caused instances of increase in the burn rate for the SLO alert received at block 802. As a more specific example, for an availability burn rate SLO alert, process 800 can check multiple instances of queries resulting in unavailability events, and determine if a threshold amount of these events are from queries sent to a particular network entity. When the burn rate SLO alert is specific to a network entity, process 800 can continue to block 808; otherwise the errors are likely the result of insufficient server resources and process 800 can proceed to block 806.

At block 806, process 800 can spin up additional resources as an automated response to the burn rate for the SLO alert. This can include adding nodes (virtual machines or contracting additional physical machines), contracting data centers, adding clusters, etc. In some cases, the type of the burn rate for the SLO alert may have an alternate automated response action mapped to it for block 806. For example, the burn rate SLO alert for traffic can incrementally roll or bounce traffic to an alternate web tier instead of or in addition to spinning up resources. As another example, the burn rate SLO alert for infrastructure tier services can skip to block 814 if an infrastructure tier burn rate SLO alert is not specific to a network entity.

At block 808, process 800 can quiesce the network entity (or a service or application, related to the burn rate for the SLO alert, on the network entity). This can pause or otherwise temporarily shut down the network entity or service/application, allowing other network entities to handle queries. In some cases, process 800 can also perform a reinitialization in relation to the network entity. This can allow the network entity or service/application to achieve a stable state before renewing its servicing of queries.

If block 808 was performed, at block 810, process 800 can determine whether the quiesce caused the burn rate to be improved but still be above the burn rate SLO alert triggering threshold (which may include a specified buffer amount). If block 806 was performed, at block 810, process 800 can determine whether the spun up resources, added at block 806, caused the burn rate to be improved but still be above the burn rate SLO alert triggering threshold (which may include a specified buffer amount). If the burn rate was improved but is still above the alert triggering threshold (plus the buffer amount, if any), process 800 can continue to block 812; if not (meaning either the automatic remedial actions of blocks 806 or 808 did not improve the burn rate or these remedial actions brought the burn rate below the alert triggering threshold, by at least the buffer amount, if any), process 800 can continue to block 814.

At block 812, process 800 can repeat process 800 until an instance of block 810 returns no or until a maximum amount of resources have been added at an instance of block 806 or quiescence of another network entity, at block 808, would unacceptably limit server availability. For example, process 800 can iteratively spin up resources until the burn rate, triggering the alert from block 802, has been reduced to an acceptable level or adding resources no longer helps that burn rate. In some cases when process 800 repeats, an alternate remedial action may be performed. For example, if resources were spun up in a previous iteration of process 800, a network entity or related application/service can be quiesced in the next iteration.

At block 814, process 800 can report to an administrator the SLO alert indicating that the burn rate was (or still is) above the corresponding threshold. Process 800 can also provide details of the resources spun up in the various executions of block 806, which network entities or services/applications were quiesced in the various executions of block 808, and/or how these actions affected the status of the burn rate for which the SLO alert was issued.

The reporting that is performed at block 814 can depend on whether the remedial actions did not improve or completely solved the issue, as determined at block 810. For example, if the remedial actions completely solved the issue, the report can be marked low urgency and can include statistics on how the automatic remedial actions resolved the burn rate SLO issue. However, if the automated remedial actions did not improve the burn rate SLO issue, the report can be marked high urgency, can include details on what automated remedial actions were ineffective (so they don't need to be repeated), and can include suggestions for manual remedial actions. In some implementations, the type of reporting can further be based on a history of SLO alerts of this type. For example, for the saturation burn rate SLO alert, a report (or an urgent report) may only be sent out if at least two saturation burn rate SLO alerts have been received in the past 24 hours. Following the reporting, process 800 can end.

Figure 9:
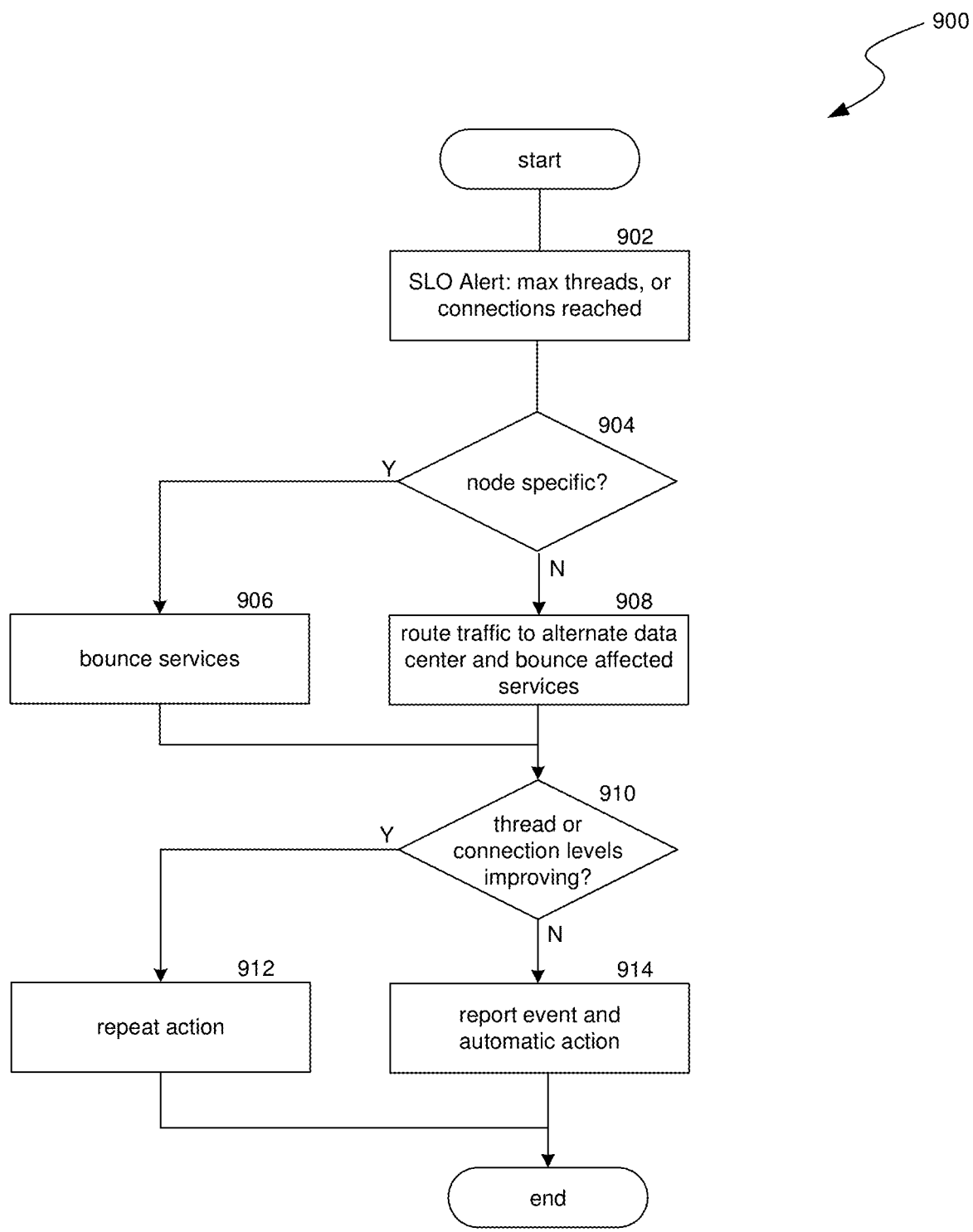
FIG. 9 is a flow diagram illustrating a process used in some implementations for automatically taking remedial actions for maximum threads or connections SLO alerts.

FIG. 9 is a flow diagram illustrating a process 900 used in some implementations for automatically taking remedial actions for maximum thread or maximum connection SLO alerts. In some implementations, process 900 is a specific instance of process 400.

At block 902, process 900 can receive a SLO alert for a value indicating executing threads or connections is above a defined threshold. At block 904, process 900 can identify if the alert is related to a particular network node. If so, process 900 can continue to block 906; otherwise the error is likely data center specific and process 900 can proceed to block 908.

At block 906, process 900 can restart or ("bounce") services from the node identified at block 904 to another available node. At block 908, process 900 route traffic away from the affected data center to an alternate data center, bounce affected services, and slow roll queries (i.e., a controlled migration of traffic in a controlled fashion, with observation and logging for roll back) to the alternate data center.

At block 910, process 900 can determine whether the service bounce performed at block 906 or the routing to an alternate data center at block 908 has caused the thread or connection levels to improve, without solving the SLO alert determined at block 902. If the thread or connection level was improved but is still above the alert triggering threshold, process 900 can continue to block 912; if not (meaning either the automatic remedial actions of blocks 906 or 908 did not improve the thread or connection levels or these remedial actions brought the thread or connection levels below the alert triggering threshold), process 900 can continue to block 914.

At block 912, process 900 can repeat process 900 until an instance of block 910 returns no or until a maximum number of service bounces have occurred at an instance of block 906 or there are no other data centers to route queries to at an instance of block 908. In some cases when process 900 repeats, an alternate remedial action may be performed. For example, if services were bounced at block 906 in a previous iteration of process 900, traffic can be routed to an alternate data center in the next iteration.

At block 914, process 900 can report to an administrator the SLO alert indicating that the thread level or connection level was (or still is) above the corresponding threshold. Process 900 can also provide details of the service bounced of block 906, how much and were traffic was rerouted at block 908, and/or how these actions affected the status of the thread or connection level SLO.

The reporting that is performed at block 914 can depend on whether the remedial actions did not improve or completely solved the issue, as determined at block 910. For example, if the remedial actions completely solved the issue, the report can be marked low urgency and can include statistics on how the automatic remedial actions resolved the thread or connection level SLO issue. However, if the automated remedial actions did not improve the thread or connection level SLO issue, the report can be marked high urgency, can include details on what automated remedial actions were ineffective (so they don't need to be repeated), and can include suggestions for manual remedial actions. Following the reporting, process 900 can end.

Figure 10:
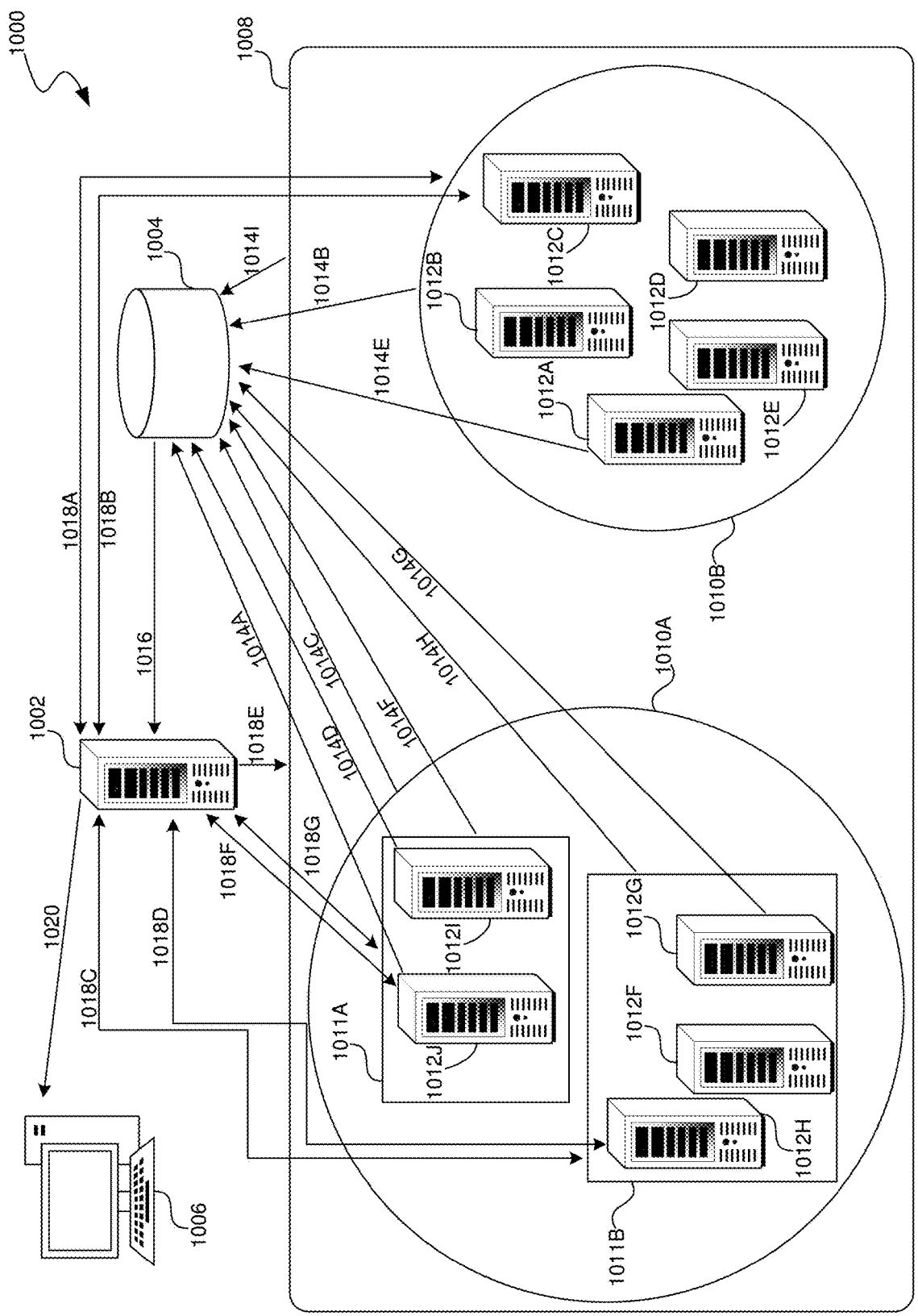
FIG. 10 is a conceptual diagram illustrating an example system that can receive notifications and, based on the type and thresholds comparisons, can take automated remedial actions.

FIG. 10 is a conceptual diagram illustrating an example system 1000 that can receive alerts or notifications and, based on the type and thresholds comparisons, can take automated remedial actions. System 1000 includes a network with entities such as a cluster 1008, data centers 1010A and 1010B, availability zones 1011A and 1011B, and servers (with multiple nodes) 1012A-1012J. System 1000 also includes an automated remediation system 1002, a network status monitor and alert system 1004, and an administrator terminal 1006.

In operation of example system 1000, status information is provided to the network status monitor and alert system 1004 through connections 1014A-1014I. Connections 1014A-1014I can perform this monitoring with interrogations from the network status monitor and alert system 1004 or from the network entities pushing status information to the network status monitor and alert system 1004. The network status monitor and alert system 1004 can have various thresholds and processes (such as thresholds defined by service level objectives) that cause the network status monitor and alert system 1004 to report issues, to the automated remediation system 1002, through alerts or notifications 1016. These can include, for example, latency alerts, error budget alerts, identifications of resource underutilization, availability burn rate alerts, latency burn rate alerts, traffic burn rate alerts, saturation burn rate alerts, infrastructure tier burn rate alerts, maximum threads or connections alerts, etc. Through the execution of one or more of processes 400-900, the automated remediation system 1002 can utilize a mapping to select which automated response to perform for one or more selected network entities. The automated remediation system 1002 can, via connections 1018A-1018G, perform one or more of these automated responses, measure the effectiveness of these automated responses, and perform follow-up actions until the issue is resolved or no further actions are mapped to the alert type. For clarity purposes, not all connections 1014 or 1018 are shown (e.g., there may be additional connections between systems 1012B-G and network status monitor and alert system 1004 and additional connections between automated remediation system 1002 and other network entities). The automated remediation system 1002 can also report the alert and the remedial actions taken through reporting 1020.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for automatically taking remedial actions for service level objective (SLO) thresholds, the method comprising:
   receiving a first SLO alert indicating a first issue;
   determining that a first type of the first SLO alert is mapped to a resource utilization automated response and, in response, performing a first automated remedial action including making available additional network resources, wherein the making available additional resources includes:
      making available a first set of additional network resources;
      determining that the first set of additional network resources improved the first issue but did not resolve the first issue; and
      in response, making available a second set of additional network resources;
   receiving a second SLO alert indicating a second issue;
   determining that a second type of the second SLO alert is not mapped to a resource utilization automated response and, in response, performing a second automated remedial action including:
      identifying one or more network services or entities related to the second SLO alert; and
      shunting queries for the identified one or more network services or entities to an alternate available provider;
   identifying that the first automated remedial action remedied the first issue; and
   providing a report indicating the first SLO alert and the additional network resources made available in the first automated remedial action.

2. The method of claim 1, wherein the first SLO alert is an alert that a query latency is above a corresponding threshold.

3. The method of claim 1, wherein a burn rate is a trend in a SLO metric, and wherein the first SLO alert is an alert that a burn rate is above a corresponding threshold.

4. The method of claim 1, wherein a burn rate is a trend in a SLO metric, and wherein the first SLO alert is an alert that an availability burn rate is above a corresponding threshold, a latency burn rate is above a corresponding threshold, or a saturation burn rate is above a corresponding threshold.

5. The method of claim 1, wherein the second SLO alert is an alert that a hard error is occurring in response to queries on a network.

6. The method of claim 1, wherein the shunting queries includes identifying A) an alternate data center without the second issue or B) an alternate availability zone without the second issue, to handle the shunted queries.

7. The method of claim 1, wherein the report is a first report and wherein the method further comprises:
   identifying the second automated remedial action did not remedy the second issue; and
   providing a second report indicating the second SLO alert, the second automated remedial actions performed, and that the second issue is unresolved.

8. The method of claim 1 further comprising:
   receiving a third alert indicating underutilization of network resources; and
   in response, performing a third automated remedial action including removing network resources.

9. A non-transitory computer-readable storage medium storing instructions that, when executed by a computing system, cause the computing system to perform a process for automatically taking remedial actions, the process comprising:
   receiving a first alert indicating a first issue;
   determining that a first type of the first alert is mapped to a resource utilization automated response and, in response, performing a first automated remedial action including making available additional network resources, wherein the making available additional resources includes:
      making available a first set of additional network resources;
      determining that the first set of additional network resources improved the first issue but did not resolve the first issue; and
      in response, making available a second set of additional network resources;
   receiving a second alert indicating a second issue;
   determining that a second type of the second alert is not mapped to a resource utilization automated response and, in response, performing a second automated remedial action including:
      identifying one or more network services or entities related to the second alert; and shunting queries for the identified one or more network services or entities to an alternate available provider;
identifying that the first automated remedial action remedied the first issue; and
providing a report in relation to the first alert.

10. The non-transitory computer-readable storage medium of claim 9, wherein the process further comprises:
receiving a third alert indicating underutilization of network resources; and
in response, performing a third automated remedial action including removing network resources.

11. The non-transitory computer-readable storage medium of claim 9, wherein the first alert is an alert that a query latency is above a corresponding threshold.

12. The non-transitory computer-readable storage medium of claim 9, wherein a burn rate is a trend in a SLO metric, and wherein the first alert is an alert that a burn rate is above a corresponding threshold.

13. The non-transitory computer-readable storage medium of claim 9, wherein a burn rate is a trend in a SLO metric, and wherein the first alert is an alert that an availability burn rate is above a corresponding threshold, a latency burn rate is above a corresponding threshold, or a saturation burn rate is above a corresponding threshold.

14. A computing system for automatically taking remedial actions, the computing system comprising:
one or more processors; and
one or more memories storing instructions that, when executed by the one or more processors, cause the computing system to perform a process comprising:
receiving a first alert indicating a first issue;
determining that a first type of the first alert is mapped to a resource utilization automated response and, in response, performing a first automated remedial action including making available additional network resources, wherein the making available additional resources includes:
making available a first set of additional network resources;
determining that the first set of additional network resources improved the first issue but did not resolve the first issue; and
in response, making available a second set of additional network resources;
receiving a second alert indicating a second issue;
determining that a second type of the second alert is not mapped to a resource utilization automated response and, in response, performing a second automated remedial action including:
identifying one or more network services or entities related to the second alert; and
shunting queries for the identified one or more network services or entities to an alternate available provider;
identifying that the first automated remedial action remedied the first issue; and
providing a report in relation to the first alert.

15. The computing system of claim 14, wherein the second alert is an alert that a hard error is occurring in response to queries on a network.

16. The computing system of claim 14, wherein the shunting queries includes identifying A) an alternate data center without the second issue or B) an alternate availability zone without the second issue, to handle the shunted queries.

17. The computing system of claim 14, wherein the report is a first report and wherein the process further comprises:
identifying the second automated remedial action did not remedy the second issue; and
providing a second report indicating the second alert, the second automated remedial actions performed, and that the second issue is unresolved.

18. The computing system of claim 14, wherein a burn rate is a trend in a SLO metric, and wherein the first alert is an alert that a burn rate is above a corresponding threshold.

19. The computing system of claim 14, wherein a burn rate is a trend in a SLO metric, and wherein the first SLO alert is an alert that an availability burn rate is above a corresponding threshold, a latency burn rate is above a corresponding threshold, or a saturation burn rate is above a corresponding threshold.

20. The computing system of claim 14, wherein the process further comprises:
receiving a third alert indicating underutilization of network resources; and
in response, performing a third automated remedial action including removing network resources.

* * * * *